United States Patent
Sim

(10) Patent No.: US 7,873,157 B1
(45) Date of Patent: Jan. 18, 2011

(54) METHOD AND APPARATUS FOR PERFORMING PREDICTIVE DIALING

(75) Inventor: Kim Huat Sim, Singapore (SG)

(73) Assignee: Avaya Inc., Basking Ridge, NJ (US)

( * ) Notice: Subject to any disclaimer, the term of this patent is extended or adjusted under 35 U.S.C. 154(b) by 1000 days.

(21) Appl. No.: 11/709,954

(22) Filed: Feb. 23, 2007

(51) Int. Cl.
*H04M 3/00* (2006.01)

(52) U.S. Cl. .......................... 379/266.08; 379/266.07; 379/266.02; 379/266.03; 379/265.01; 379/265.02; 705/8; 705/9

(58) Field of Classification Search ............ 379/266.08, 379/266.07, 266.02, 266.03, 265.01, 265.02; 705/8, 9
See application file for complete search history.

(56) References Cited

U.S. PATENT DOCUMENTS

| | | | |
|---|---|---|---|
| 5,436,965 A * | 7/1995 | Grossman et al. ...... | 379/266.08 |
| 7,046,789 B1 * | 5/2006 | Anderson et al. ...... | 379/265.01 |
| 7,564,962 B1 * | 7/2009 | O'Keeffe et al. ....... | 379/265.09 |
| 2004/0042611 A1 * | 3/2004 | Power et al. ........... | 379/265.02 |
| 2004/0120502 A1 * | 6/2004 | Strathmeyer et al. ... | 379/265.01 |
| 2006/0251237 A1 * | 11/2006 | Singer ................... | 379/265.05 |
| 2008/0059278 A1 * | 3/2008 | Medina et al. ................. | 705/9 |
| 2008/0159521 A1 * | 7/2008 | Sneyders et al. ....... | 379/266.07 |

* cited by examiner

*Primary Examiner*—Curtis Kuntz
*Assistant Examiner*—Phung-Hoang J Nguyen
(74) *Attorney, Agent, or Firm*—Chapin IP Law, LLC; David W. Rouille, Esq.

(57) ABSTRACT

A method, apparatus and computer program product for performing predictive dialing is presented. A probability of contact for each customer of a plurality of customers for a predetermined period of time is determined. A number of agents available during the predetermined period of time are also determined. A selection is then made regarding which customers to call based on the number of agents available during the time period and the probability of contact for each of the plurality of customers for a predetermined period of time. The number of calls are then placed to the selected customers.

15 Claims, 4 Drawing Sheets

METHOD AND APPARATUS FOR PERFORMING PREDICTIVE DIALING

BACKGROUND

Telephone call centers represent the front line for customer service, marketing operations, and debt collection for many businesses. Typical call centers receive or make hundreds of telephone calls per day with the aid of automated telephony equipment, such as a predictive dialer. A predictive dialer is a computerized system that automatically dials batches of telephone numbers for connection to agents assigned to sales or other campaigns. The predictive dialer monitors the answers to the calls it places, detecting how the calls it makes are answered. The predictive dialer discards unanswered calls, engaged numbers, disconnected lines, answers from fax machines, answering machines and similar automated services, and only connects calls answered by people to waiting agents. Thus, the predictive dialer frees agents from listening to unanswered or unsuccessful calls.

A predictive dialer can dramatically increase the time an agent spends on communication rather than waiting. Predictive dialing systems are commonly used by telemarketing organizations involved in B2C (business to consumer) calling as it allows their sales representatives to have much more customer contact time. Predictive dialing systems may also be used by market survey companies and debt collection services that need to contact and personally speak to a lot of people by telephone. More commonly predictive dialing systems are now being used as a quick and easy way to automate all sorts of calls which would otherwise be made manually by a call center, such as welcome calls for new customers, customer service call backs, appointment confirmations, or even for the automation of large numbers of ad hoc calls that might need to take place (such as by a taxi company, parcel delivery service, and the like).

Predictive dialers generally rely on the fact that if a person was to sit down and manually dial a large number of people, a large percentage of these calls will not result in contact with someone at the other end. Out of 1000 calls made, typically only about twenty five percent to thirty five percent of the calls made would actually connect to a live person. Of the rest, a large percentage (typically forty percent to sixty percent) won't be answered at all, about ten percent might be answered by answering machines, faxes, modems or other electronic devices, around five percent of the dialed numbers would be busy and the rest will result in network errors, or be identified as invalid numbers. For call centers that need to make large numbers of outbound calls, this represents a large problem. Typically in manual dialing environments, a given agent will spend around eighty percent of their time listening to the phone ring waiting to talk to someone, or dealing with invalid numbers or answering machines and only about twenty percent of their time actually doing what they are really there to do. By using a predictive dialer to filter out these unproductive calls and to spare the agent from having to wait for the phone to be answered each time, call centers can reverse the situation. Agents can spend on average around eighty percent of their time talking to customers and only about twenty percent of their time waiting for the next call, resulting in a three hundred percent increase in productivity.

The predicative dialer is commonly interfaced into Customer Relation Management (CRM) software, to both generate call lists and report call attempts. Unsuccessful calls are often analyzed to determine if the number called needs to be called back later or needs special treatment, such as a manual or autodialed call by an agent to listen to an answer machine message.

The predictive dialer exhibits predictive behavior when it has more call attempts (dials) outstanding than it has agents that are already available to handle calls. The predictive dialing happens when the predictive dialer dials ahead of the agents becoming available or when the predictive dialer matches a forecast number of available agents with a forecast number of available called parties. The matching and dialing ahead perspectives provide the large increases in dial rates and agent productivity.

As an example, if a system has one hundred agents associated with it, the predictive dialer will dial a number of calls based on a phone line to agent ratio of 1.5:1 or 2:1. This means that for each available agent, the system will dial the phone numbers of two potential customers. As these calls are made to the telephone network the dialer will monitor each call and determine what the outcome of the call was. From one hundred and fifty calls made, the system will immediately strip out any unproductive outcomes, such as busy calls (these are usually queued for automatic redial), calls that go unanswered (referred to as "no answers") and invalid numbers. Some predictive dialers incorporate "answering machine detection", which tries to determine if a live person or answering machine picked up the phone. This is one cause of the typical delays that a party answering a call may experience before being connected to an agent.

If not enough calls are made ahead; agents will sit idle, whereas if there are too many calls made and there are not enough agents to handle them, then the call is typically dropped.

An advanced predictive dialer determines and uses many operating characteristics that it learns during the calling campaign. The predictive dialer uses these statistics continually to make sophisticated predictions so as to minimize agent idle time while controlling occurrences of nuisance calls, which are answered calls without the immediate benefit of available agents. An advanced predictive dialer can readily maintain the ratio of nuisance calls to answered calls at less than a fraction of one percent while still dialing ahead. However, this level of performance may require a sufficiently large critical mass of agents. Conversely, it becomes increasingly difficult to maintain a high talk time percentage with a lower number of agents without increasing dropped calls Predictive dialing systems use algorithms to control the ratio of calls to agents. Because a predictive dialer cannot know what proportion of its calls will connect until it has made them, it will alter its dialing rate depending on how many connections it manages to achieve. Occasionally the system will get more live parties on call attempts than there are agents available take those calls. Consequently, the dialer will disconnect or delay distribution of calls that cannot be distributed to an agent. This is known as a silent call or a nuisance call. The called party hears only silence when the predictive dialer does not at least play a recorded message. The experience for those who receive this type of predictive dialer call can be less than satisfactory.

There may be an appreciable period of non-response before a call is routed to a sales representative. This annoys people and also gives them a chance to abandon the call. If no sales representative is available for a successful call, it is often disconnected.

Predictive dialers integrate voice and data processing so businesses can maximize their productivity and efficiency when proactively calling their customer bases. Many predictive dialers are "closed"; that is, they operate as stand-alone systems. By contrast, "open" predictive dialers permit an entire enterprise to access the predictive application while also allowing access from the predictive dialer to any application in that enterprise. Open dialers have no limits to expansion and can function harmoniously with a user's computer and telephone systems.

SUMMARY

Conventional mechanisms such as those explained above suffer from a variety of deficiencies. One such deficiency is that conventional predictive dialers only pace according to the history of the calls made. For example, based on the history, the contact rate is twenty-five percent, the system will pick the next four customer records and dials, assuming one of the calls will reach a contact. However, all four customers might all pick up the calls at the same time, but only a single agent is available, resulting in the other three calls being abandoned.

Certain applications, for example using best time to call solutions (CallTech) from Austin Logistics are able to calculate the best time to call each customer and the probability of reaching the customer in each single hour (e.g., a twenty five percent of reaching customer A at 10:000 a.m.). If four records are passed to the dialer and each of them have the probability of fifty percent of reaching the customers, the dialer will still based on its pacing calculation, launch too many or too little calls.

The determination of the number of calls to make at a given time is based on calls made to other customers, which typically has little or no relationship to the next call the predictive dialer is scheduled to make to another customer. The number of calls to be dialed is typically based on a call history comprising the last predetermined number of calls made (e.g., based on the last one hundred calls made) or on the calls made during a predetermined period of time (e.g., the last fifteen minutes of calls made). This results in a large number of nuisance calls made and reduces the performance of the predictive dialer and/or the productivity of the agent or agents.

Embodiments of the invention significantly overcome such deficiencies and provide mechanisms and techniques that provide a predictive dialing mechanism which reduces the overall number of calls made which in turn reduces nuisance calls as well as increasing agent productivity.

In a particular embodiment of a method for performing predictive dialing, the method includes determining a probability of contact for each customer of a plurality of customers for a predetermined period of time. The method further includes determining a number of agents available during the predetermined period of time and determining which customers to call based on the number of agents available during the time period and the probability of contact for each of the plurality of customers.

Other embodiments include a computer readable medium having computer readable code thereon for providing predictive dialing. The computer readable medium includes instructions for determining a probability of contact for each customer of a plurality of customers for a predetermined period of time. The computer readable medium further includes instructions for determining a number of agents available during the predetermined period of time as well as instructions for determining which customers to call based on the number of agents available during the time period and the probability of contact for each of a plurality of customers.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides predictive dialing as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing predictive dialing as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
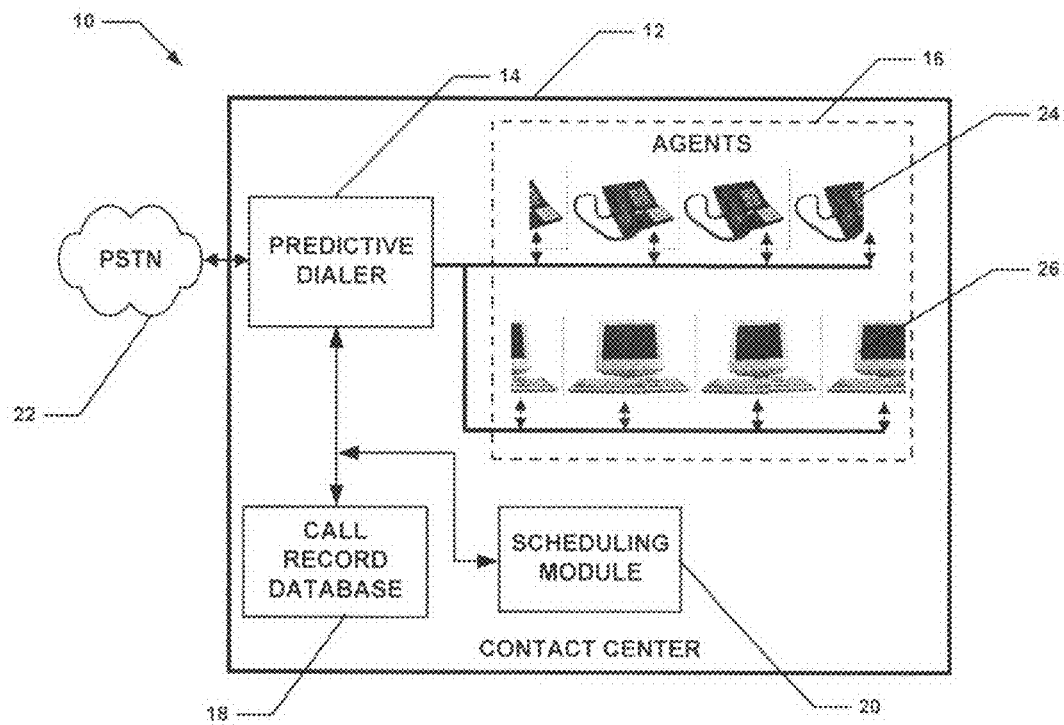
FIG. 1 depicts a block diagram of a predictive dialing system in accordance with embodiments of the invention.

Referring now to FIG. 1, a contact center environment 10 includes a contact center 12 connected to the public switched telephone network 22 (PSTN) is shown. The PSTN 22 will be recognized to be the worldwide telephone system that provides telephone call connections, including telephone connections to the contact center 12.

Agents 16 (e.g., sales representatives, customer support personnel or the like) can have access to agent telephones, of which agent telephone 24 is representative of all agent telephones. The agents 16 can also have access to agent computers, of which agent computer 26 is representative of all agent computers.

Identifying information can be automatically provided to the agent 16 by a variety of methods. The identifying information may be coordinated with "caller data," for example account history associated with the called party, contained in the call record database 18. An application program can automatically provide a display of the caller data in a "screen pop" to the agent disposed upon the agent computer 26. Alternatively, the application program can reside within the agent computer 26.

Call center 12 includes a predictive dialer 14. In the embodiment shown in FIG. 1, interfaced to predictive dialer 14 in call center 12 are multiple agents 16 Agents 16 have workstations 26 where operators or agents speak to the individuals whose telephone numbers are called by predictive dialer 14. While in this example, the predictive dialer 14, the call record database 18 and the scheduling module 20 are shown as separate entities, it should be understood that either or both of the call record database 18 and the scheduling module 20 may be included as part of the predictive dialer 14.

Predictive dialer 14 dials telephone numbers extracted from the call records maintained in call record database 18. If an individual answers the telephone, predictive dialer 14 transfers the telephone call to one of agents 16 so that the agent 16 can speak with the individual. Predictive dialer 14 therefore improves telephone calling efficiency by dialing the telephone number and transferring the call to an agent 16 only if an individual answers the telephone.

Predictive dialer 14 also tracks the call attempt results of every call placed. The call attempt results include whether or not a call resulted in a right party contact, a wrong party contact, no answer, or an answering machine. For example, the goal of a call record for John Doe is to talk with John Doe. If agent 16 speaks with John Doe, that is a right party contact and a successful call attempt result. If John Doe's babysitter answers the phone and John Doe is not home, that is a wrong party contact and an unsuccessful call attempt result. If no one answers the phone or an answering machine answers the phone, that is an unsuccessful call attempt result since the desired party was not contacted. Therefore throughout the day, scheduling module 20 queries predictive dialer 14 for call attempt results and uploads the call attempts results. If a call attempt result is unsuccessful, then scheduling module 20 updates the call record in the call record database 18 so that the predictive dialer 14 may call the call record again at a later time in the day. The call records are maintained in the call record database 18. The call record for John Doe may contain John Doe's name, his telephone number, and account number.

Scheduling module 20 operates to develop and provide optimal calling strategies for the call records including resource optimization, automated statistical modeling and flexible strategy management.

In operation, a call history record for several customers, for example as shown in Table 1, is produced. This can be accomplished by several different means. The probability can be calculated with the percentage of contact and may further include customer business requirements. For example in debt collection applications, the probability of contact P can be calculated as forty percent of RPC (right party contact) plus forty percent of Amount Owed plus twenty percent of Days Past Due.

TABLE 1

| Customer | Probability of contact (P) | | |
|---|---|---|---|
| | 9am | 10am | 11am... |
| Customer A | 50% | ... | |
| Customer B | 50% | | |
| Customer C | 80% | | |
| Customer D | 90% | | |
| Customer E | 10% | | |
| Customer F | 20% | | |
| Customer G | 30% | | |
| Customer H | 40% | | |
| Customer I | 30% | | |
| Average | 44% | | |

Thus, the prior art would take the average time of all the customers (forty four percent) and thus generate two calls for an agent. However, if the two customers called happen to be Customer C and Customer D (eighty percent probability of contact and ninety percent probability of contact), there is a good chance that both would answer and one of the calls would have to be dropped, resulting in a nuisance call for one of the customers. On the other hand, if the two customers called happen to be Customer E and Customer F (ten percent probability of contact and twenty percent probability of contact), there is a good chance that neither customer would answer, resulting in a waste of predictive dialer time and agent productivity.

By way of embodiments of the present invention, using the same call history record the particular Customer(s), the probability of contact history for the time period is examined, and a "best choice" of customers and call times is determined. For example, Customer A and Customer B (fifty percent probability of contact and fifty percent probability of contact), could be called with a chance that one will answer. Similarly, Customer G, Customer H and Customer I could be called (thirty percent probability of contact, forty percent probability of contact and thirty percent probability of contact respectively), since there probability of contact adds up to one hundred percent (or close to one hundred percent) chances are that one would answer. This results in more productive use of the predictive dialer and of the agent(s). Thus the calling of customers is based on the call history associated with the particular customer for a particular period of time, instead of being based on either all calls for all customers for a particular number of prior calls or for all calls for all customers during a particular period of time.

For customers who do not have a call history, a history of a comparable customer can be used. The comparable customer can be determined by one or more of several factors, including gender of the customer, customer occupation, age of the customer and the residence of the customer.

Figure 2:
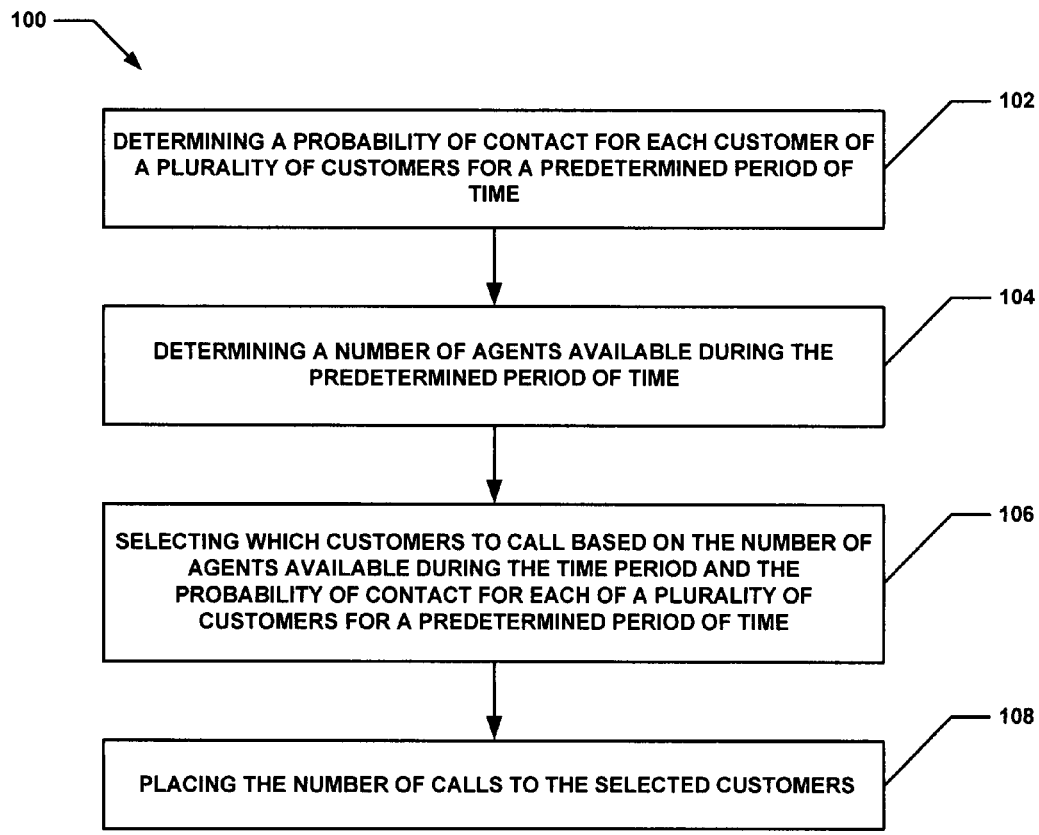
FIG. 2 depicts a flow diagram of a particular embodiment of a method for performing predictive dialing in accordance with embodiments of the invention.

Referring now to FIG. 2 a particular embodiment of a method 100 of performing predictive dialing is shown. The method begins with processing block 102 which discloses determining a probability of contact for each customer of a plurality of customers for a predetermined period of time (e.g., customer probability per hour).

Processing block 104 states determining a number of agents available during the predetermined period of time. The number of available agent may vary during the day, as more agents are needed at peak times, and less agents needed at off-peak times.

Processing block 106 recites selecting customers to call based on the number of agents available during the time period and the probability of contact for each of a plurality of customers for a predetermined period of time. Referring back to Table 1, Customer A and Customer B (fifty percent probability of contact and fifty percent probability of contact), could be called with a chance that one will answer. Similarly, Customer G, Customer H and Customer I could be called (thirty percent probability of contact, forty percent probability of contact and thirty percent probability of contact), since there probability of contact adds up to one hundred percent (or close to one hundred percent) chances are that one would answer.

Processing block 108 recites placing the number of calls to the selected customers.

Figure 3:
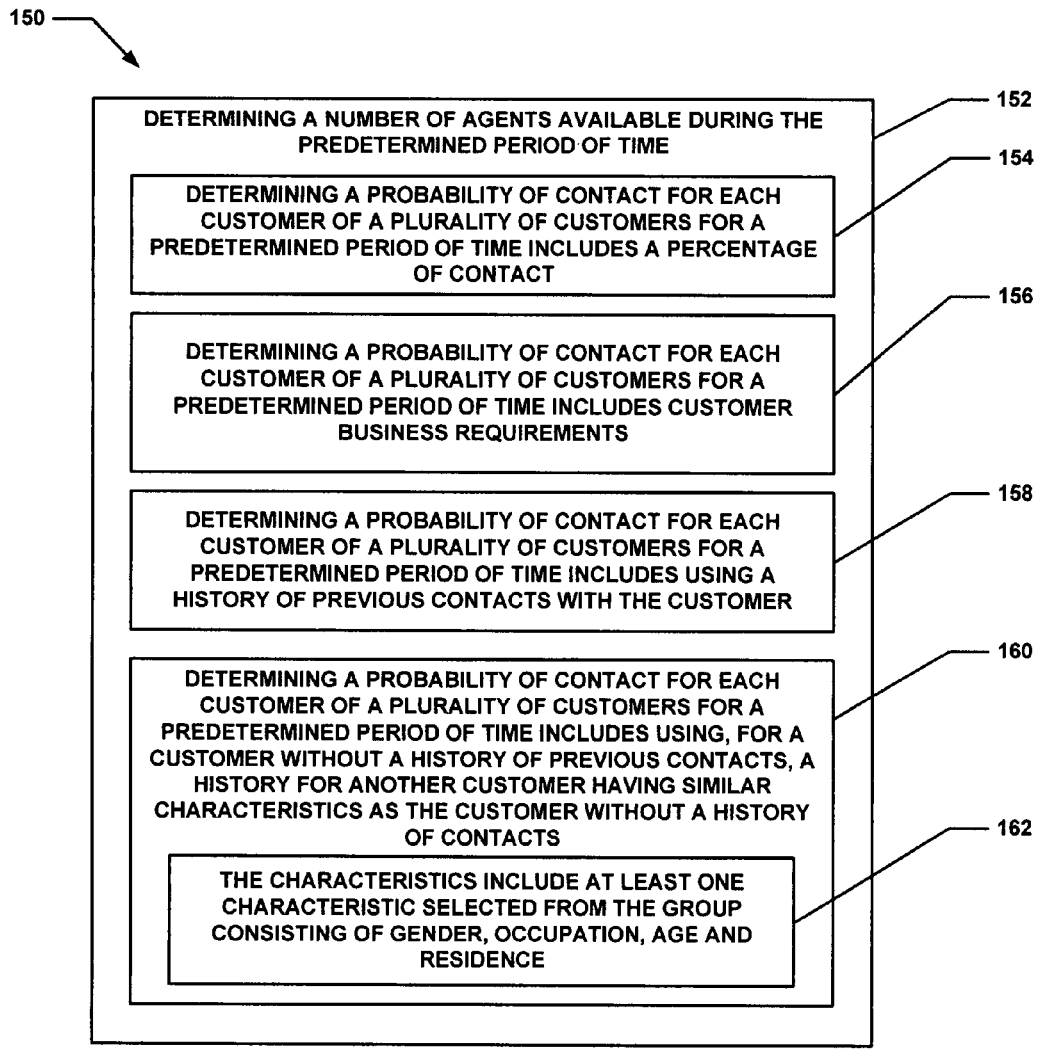
FIG. 3 depicts a flow diagram of a particular embodiment of a method of for determining a probability of contact for each customer in accordance with embodiments of the invention.

Referring now to FIG. 3 a flow diagram showing a particular embodiment of a method 150 of determining a probability of contact for each customer of a plurality of customers for a predetermined period of time is presented. The method 150 begins with processing block 152 which states the probability of contact includes a percentage of contact.

Processing block 154 discloses the determining a probability of contact for each customer of a plurality of customers for a predetermined period of time includes customer business requirements. For example in debt collection applications, the probability of contact P can be calculated as forty percent of RPC (right party contact) plus forty percent of Amount Owed plus twenty percent of Days Past Due.

Processing block 156 states the determining a probability of contact for each customer of a plurality of customers for a predetermined period of time includes using a history of previous contacts with the customer.

Processing block 158 recites the determining a probability of contact for each customer of a plurality of customers for a predetermined period of time includes using, for a customer without a history of previous contacts, a history for another customer having similar characteristics as the first customer without a previous history of contacts. The characteristics can include, as recited in processing block 160, at least one characteristic selected from the group consisting of gender, occupation, age and residence.

Figure 4:
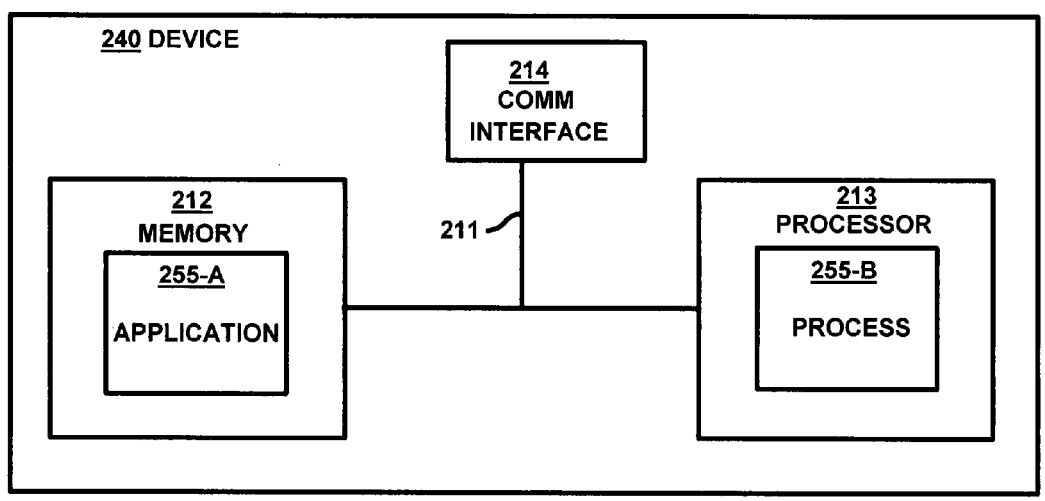
FIG. 4 illustrates an example computer system architecture for a computer system that performs predictive dialing in accordance with embodiments of the invention.

FIG. 4 illustrates example architectures of a predictive dialer (computer system) 240. The computer system 240 may be any type of computerized system such as a personal computer, workstation, portable computing device, mainframe, server or the like. In this example, the computer system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the application 255-A to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method of performing predictive dialing comprising:

determining, with a computer, a probability of contact for each customer of a plurality of customers for a predetermined period of time, wherein said determining a probability of contact for each customer of a plurality of customers for a predetermined period of time includes using, for a customer without a history of previous contacts, a history for another customer having similar characteristics as said customer without a history of contacts and wherein said characteristics include at least one characteristic selected from the group consisting of gender, occupation, age and residence;

determining, with said computer, a number of agents available during said predetermined period of time; and selecting, with said computer, which customers to call based on said number of agents available during said time period and said probability of contact for each of a plurality of customers for a predetermined period of time.

2. The method of claim 1 further comprising placing said number of calls to the selected customers.

3. The method of claim 1 wherein said determining a probability of contact for each customer of a plurality of customers for a predetermined period of time includes a percentage of contact.

4. The method of claim 1 wherein said determining a probability of contact for each customer of a plurality of customers for a predetermined period of time includes customer business requirements.

5. The method of claim 1 wherein said determining a probability of contact for each customer of a plurality of customers for a predetermined period of time includes using a history of previous contacts with said customer.

6. A non-transitory computer readable medium having computer readable code thereon for providing predictive dialing, the medium comprising:
    computer-executable instructions for determining a probability of contact for each customer of a plurality of customers for a predetermined period of time, wherein said determining a probability of contact for each customer of a plurality of customers for a predetermined period of time includes using, for a customer without a history of previous contacts, a history for another customer having similar characteristics as said customer without a history of contacts and wherein said characteristics include at least one characteristic selected from the group consisting of gender, occupation, age and residence;
    computer-executable instructions for determining a number of agents available during said predetermined period of time; and
    computer-executable instructions for selecting which customers to call based on said number of agents available during said time period and said probability of contact for each of a plurality of customers for a predetermined period of time.

7. The non-transitory computer readable medium of claim 6 further comprising computer-executable instructions for placing said number of calls to the selected customers.

8. The non-transitory computer readable medium of claim 6 wherein said computer-executable instructions for determining a probability of contact for each customer of a plurality of customers for a predetermined period of time includes a percentage of contact.

9. The non-transitory computer readable medium of claim 6 wherein said computer-executable instructions for determining a probability of contact for each customer of a plurality of customers for a predetermined period of time includes customer business requirements.

10. The non-transitory computer readable medium of claim 6 wherein said computer-executable instructions for determining a probability of contact for each customer of a plurality of customers for a predetermined period of time includes using a history of previous contacts with said customer.

11. A predictive dialing system comprising:
    a memory;
    a processor;
    a communications interface;
    an interconnection mechanism coupling the memory, the processor and the communications interface; and
    wherein the memory is encoded with a predictive dialing application that when performed on the processor, provides a predictive dialing process for processing information, the predictive dialing process causing the predictive dialer to be capable of performing the operations of:
    determining a probability of contact for each customer of a plurality of customers for a predetermined period of time, wherein said determining a probability of contact for each customer of a plurality of customers for a predetermined period of time includes using, for a customer without a history of previous contacts, a history for another customer having similar characteristics as said customer without a history of contacts and wherein said characteristics include at least one characteristic selected from the group consisting of gender, occupation, age and residence;
    determining a number of agents available during said predetermined period of time; and
    selecting which customers to call based on said number of agents available during said time period and said probability of contact for each of a plurality of customers for a predetermined period of time.

12. The predictive dialing system of claim 11 further comprising placing said number of calls to the selected customers.

13. The predictive dialing system of claim 11 wherein said determining a probability of contact for each customer of a plurality of customers for a predetermined period of time includes a percentage of contact.

14. The predictive dialing system of claim 11 wherein said determining a probability of contact for each customer of a plurality of customers for a predetermined period of time includes customer business requirements.

15. The predictive dialing system of claim 11 wherein said determining a probability of contact for each customer of a plurality of customers for a predetermined period of time includes using a history of previous contacts with said customer.

* * * * *